United States Patent
Jiang et al.

(10) Patent No.: US 12,375,239 B2
(45) Date of Patent: *Jul. 29, 2025

(54) METHOD AND DEVICE USED FOR NODE IN WIRELESS COMMUNICATION

(71) Applicant: BUNKER HILL TECHNOLOGIES LLC, Allen, TX (US)

(72) Inventors: Qi Jiang, Shanghai (CN); Xiaobo Zhang, Shanghai (CN); Lin Yang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,452

(22) Filed: Apr. 22, 2024

(65) Prior Publication Data

US 2024/0291608 A1    Aug. 29, 2024

Related U.S. Application Data

(63) Continuation of application No. 17/168,163, filed on Feb. 4, 2021, now Pat. No. 12,003,443, which is a
(Continued)

(30) Foreign Application Priority Data

Sep. 29, 2018 (CN) .......................... 201811144019.8
Nov. 12, 2018 (CN) .......................... 201811337331.9

(51) Int. Cl.
*H04L 5/00* (2006.01)
*H04W 24/10* (2009.01)
*H04W 72/044* (2023.01)

(52) U.S. Cl.
CPC ........... *H04L 5/0048* (2013.01); *H04W 24/10* (2013.01); *H04W 72/044* (2013.01)

(58) Field of Classification Search
CPC ....... H04B 7/06; H04L 5/0048; H04L 5/0051; H04L 5/0053; H04W 24/08; H04W 24/10;
(Continued)

(56) References Cited

U.S. PATENT DOCUMENTS

| 2014/0274196 A1* | 9/2014 | Dai ..................... H04W 52/242 455/522 |
| 2016/0037530 A1* | 2/2016 | Peng ................... H04W 52/243 370/329 |
| 2019/0090092 A1* | 3/2019 | Hwang ................. G01S 5/0215 |

FOREIGN PATENT DOCUMENTS

| CN | 102404837 A | 4/2012 |
| CN | 104105185 A | 10/2014 |

(Continued)

OTHER PUBLICATIONS

ISR in application PCT/CN2019/104049 dated Oct. 12, 2019.
(Continued)

*Primary Examiner* — Phuc H Tran
(74) *Attorney, Agent, or Firm* — Ascenda Law Group, PC

(57) ABSTRACT

The disclosure provides a method and device used for node in wireless communication. The first node first receives a first reference signal and a second reference signal, then determines a first power within a range not greater than a first maximum power, and finally transmits a first radio signal with the first power; wherein the first maximum power is related to a measurement result against the first reference signal and is not related to a measurement result against the second reference signal. Through determining an
(Continued)

upper limit of a transmitting power on a sidelink using a measurement result against a cellular network link, the disclosure can reduce interferences to the cellular network while ensuring the sidelink performance, and can optimize the transmitting power on the sidelink to reduce the power consumption of the terminal, thereby improving the overall performance of the system.

20 Claims, 15 Drawing Sheets

Related U.S. Application Data continuation of application No. PCT/CN2019/104049, filed on Sep. 2, 2019.

(58) Field of Classification Search
CPC ..... H04W 4/40; H04W 52/04; H04W 52/242; H04W 52/367; H04W 52/383; H04W 72/044

See application file for complete search history.

(56) References Cited

FOREIGN PATENT DOCUMENTS

| | | |
|---|---|---|
| CN | 106664694 A | 5/2017 |
| CN | 107306446 A | 10/2017 |

OTHER PUBLICATIONS

CN201811337331.9 Notification to Grant Patent Right for Invention dated May 19, 2022.
First Office Action dated Jan. 14, 2022.
First Search Report dated Jan. 24, 2022.
Intel Corporation "Sidelink Power Control for Wearable and IoT Use Cases" 3GPP TSG RAN WG1 Meeting #90 R1-1712520,Aug. 11, 2017.
CATT "Multiplexing between cellular link and D2D link" 3GPP TSG RAN WG1-RL1 R1-135093 Nov. 1, 2013.
"Unicast+groupcast+broadcast in NR V2X" 3GPP TSG RAN WG1 RL1 R1-1810721, Sep. 28, 2018.
LG Electronics"Discussion on sidelink power control for IoT and wearables" 3GPP TSG RAN WG1 RL1 May 6, 2017.

* cited by examiner

METHOD AND DEVICE USED FOR NODE IN WIRELESS COMMUNICATION

CROSS REFERENCE TO RELATED APPLICATIONS

This application is a continuation of the U.S. patent application Ser. No. 17/168,163, filed on Feb. 4, 2021, which is a continuation of International Application No. PCT/CN2019/104049, filed Sep. 2, 2019, claims the priority benefit of Chinese Patent Application No. 201811144019.8, filed on Sep. 29, 2018, and the priority benefit of Chinese Patent Application No. 201811337331.9, filed on Nov. 12, 2018, the full disclosure of which is incorporated herein by reference.

BACKGROUND

Technical Field

The disclosure relates to transmission methods and devices in wireless communication systems, and in particular to a communication method and device on sidelink in wireless communication.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The Work Item (WI) of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The Study Item (SI) of technical research of NR V2X was approved at the 3GPP RAN #80 session.

SUMMARY

In order to meet requirements of new services, compared with LTE V2X systems, NR V2X services have higher throughput, higher reliability, lower latency, further transmission distance, more accurate positioning, higher variability in packet size and transmission periodicity, and key technical features coexisting with current 3GPP technologies and non-3GPP technologies more efficiently. The work mode of the present LTE V2X systems is limited to broadcast transmission only. According to common knowledges reached at the 3GPP RAN #80 plenary session, NR V2X will study a technical scheme supporting multiple work modes of unicast, groupcast and broadcast.

In the work mode of the present LTE Device to Device (D2D)/V2X, a radio signal transmitted through sidelink by a User Equipment (UE) is broadcast, and the radio signal is not directed to a specific UE. In order not to generate interferences to the cellular uplink transmission over a Uu interface, a transmitting power on sidelink is determined according to a path loss between Uu interfaces of the transmitting terminal and the base station. However, when two terminals performing Device to Device (D2D) or V2X communication are close in distance, the above transmitting power determined based on the Uu interface path loss will lead to waste of terminal power. Meanwhile, when there are multiple beams between the base station and the terminal, the existing method to determine a transmitting power needs to be redesigned.

In view of the above problems, the disclosure provides a solution to support unicast transmission. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for unicast based transmission mechanisms, the disclosure is also applicable to broadcast and groupcast transmissions. Furthermore, although the disclosure is initially designed for single-carrier communications, the disclosure is also applicable to multi-carrier communications.

The disclosure provides a method in a first node for wireless communication, wherein the method includes:
  receiving a first reference signal and a second reference signal;
  determining a first power within a range not greater than a first maximum power; and
  transmitting a first radio signal with the first power.

Herein, the first maximum power is related to a measurement result against the first reference signal and is not related to a measurement result against the second reference signal; and the first power is related to the measurement result against the second reference signal.

In one embodiment, the above method has the following benefits: through using the measurement result against the first reference signal as an upper limit of a transmitting power of the first radio signal, that is, using the measurement result on a Uu interface to limit the transmitting power on a PC-5 interface, the disclosure guarantees that the transmission of radio signals on the PC-5 interface will not generate interferences to the Uu interface.

In one embodiment, the above method has another following benefit: the first maximum power is only used as an upper limit of the first power, and the determination of the first power actually refers to the measurement result against the second reference signal, that is to say, the actual transmitting power on the PC-5 interface refers to a path loss measured on the PC-5 interface, which ensures that the selected transmitting power on the PC-5 interface can guarantee the correct reception of radio signals on the PC-5 interface.

According to one aspect of the disclosure, the above method includes:
  receiving first information.

Herein, the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

In one embodiment, the above method has the following benefits: the first maximum power takes effect only for radio signals on the PC-5 interface transmitted in the first time-frequency resource pool; when the K1 first-type time-frequency resource pools correspond to K1 uplink receiving beams of the base station respectively, the above scheme designs the first maximum power to be beam-specific; since different beamforming vectors bring different beam gains, the above beam-specific power control scheme will be more accurate and effective.

According to one aspect of the disclosure, the above method includes:

transmitting second information.

Herein, the second information is used for indicating a first power difference, and the first power difference is equal to a difference between the first maximum power and the first power; a receiver of the second information includes the transmitter of the first reference signal; and the second information is transmitted through an air interface.

In one embodiment, the above method has the following benefits: through the second information, the transmitting terminal of V2X or D2D transmits a possible power room to be increased on the PC-5 interface to the base station, thereby indirectly helping the base station learn the channel quality on the PC-5 link.

In one embodiment, the above method has another following benefit: the quality of transmission over the PC-5 interface is reflected through the second information indirectly; when the first power difference indicated by the second information is small, meanwhile the performance on the PC-5 interface is not good, it is indicated that the transmitting terminal of V2X cannot improve the performance on the PC-5 interface through raising power; thus, the base station will improve the performance of transmission over the PC-5 interface by changing the time-frequency resource pool used for transmitting the first radio signal.

According to one aspect of the disclosure, the above method includes:

receiving (K1-1) first-type radio signal(s) among K1 first-type radio signals.

Herein, the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

In one embodiment, the above method has the following benefits: when the K1 first-type time-frequency resource pools correspond to K1 uplink receiving beams of the base station respectively, different first-type maximum powers are configured for different uplink receiving beams, which further achieves beamforming gains and increases the reliability and effectiveness of the scheme proposed in the disclosure.

According to one aspect of the disclosure, the above method includes:

receiving (M1-1) second-type radio signal(s) among M1 second-type radio signals.

Herein, the second reference signal is one second-type radio signal among the M1 second-type radio signals, the M1 is an integer greater than 1.

In one embodiment, the above method has the following benefits: the PC-5 interface also maintains multiple beams, and the second reference signal is only one beam among multiple beams, which further achieves beamforming gains and increases the reliability and effectiveness of the scheme proposed in the disclosure.

The disclosure provides a method in a second node for wireless communication, wherein the method includes:

transmitting a first reference signal.

Herein, a receiver of the first reference signal includes a first node, and the first node receives a second reference signal; a first maximum power is related to a measurement result against the first reference signal and is not related to a measurement result against the second reference signal; a first power is related to the measurement result against the second reference signal; the first node determines the first power within a range not greater than the first maximum power, and the first node transmits a first radio signal with the first power; a receiver of the first radio signal includes a transmitter of the second reference signal.

According to one aspect of the disclosure, the above method includes:

transmitting first information.

Herein, the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

According to one aspect of the disclosure, the above method includes:

receiving second information.

Herein, the second information is used for indicating a first power difference, and the first power difference is equal to a difference between the first maximum power and the first power; and the second information is transmitted through an air interface.

According to one aspect of the disclosure, the above method includes:

transmitting (K1-1) first-type radio signal(s) among K1 first-type radio signals.

Herein, the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

The disclosure provides a method in a third node for wireless communication, wherein the method includes:

transmitting a second reference signal; and receiving a first radio signal.

Herein, a transmitter of the first radio signal receives a first reference signal and the second reference signal, a first maximum power is related to a measurement result against the first reference signal and is not related to a measurement result against the second reference signal; a first power is related to the measurement result against the second reference signal; a transmitter of the first radio signal determines the first power within a range not greater than the first maximum power, and transmits the first radio signal with the first power; a transmitter of the first reference signal and the third node are non co-located.

According to one aspect of the disclosure, the above method includes:

transmitting (M1-1) second-type radio signal(s) among M1 second-type radio signals.

Herein, the second reference signal is one second-type radio signal among the M1 second-type radio signals, the M1 is an integer greater than 1.

The disclosure provides a first node for wireless communication, wherein the first node includes:

a first receiver, to receive a first reference signal and a second reference signal;

a first processor, to determine a first power within a range not greater than a first maximum power; and a first transmitter, to transmit a first radio signal with the first power.

Herein, the first maximum power is related to a measurement result against the first reference signal and is not related to a measurement result against the second reference signal; and the first power is related to the measurement result against the second reference signal;

The disclosure provides a second node for wireless communication, wherein the second node includes:

a second transmitter, to transmit a first reference signal.

Herein, a receiver of the first reference signal includes a first node, and the first node receives a second reference signal; a first maximum power is related to a measurement result against the first reference signal and is not related to a measurement result against the second reference signal; a first power is related to the measurement result against the second reference signal; the first node determines the first power within a range not greater than the first maximum power, and the first node transmits a first radio signal with the first power; a receiver of the first radio signal includes a transmitter of the second reference signal.

The disclosure provides a third node for wireless communication, wherein the third node includes:

a third transmitter, to transmit a second reference signal; and a third receiver, to receive a first radio signal.

Herein, a transmitter of the first radio signal receives a first reference signal and the second reference signal, a first maximum power is related to a measurement result against the first reference signal and is not related to a measurement result against the second reference signal; a first power is related to the measurement result against the second reference signal; a transmitter of the first radio signal determines the first power within a range not greater than the first maximum power, and transmits the first radio signal with the first power; a transmitter of the first reference signal and the third node are non co-located.

In one embodiment, compared with conventional schemes, the disclosure has the following advantages.

Through using the measurement result against the first reference signal as an upper limit of a transmitting power of the first radio signal, that is, using the measurement result on a Uu interface to limit the transmitting power on a PC-5 interface, the disclosure guarantees that the transmission of radio signals on the PC-5 interface will not generate interferences to the Uu interface; meanwhile, the determination of the first power actually refers to the measurement result against the second reference signal, that is to say, the actual transmitting power on the PC-5 interface refers to a path loss measured on the PC-5 interface, which ensures that the selected transmitting power on the PC-5 interface can guarantee the correct reception of radio signals on the PC-5 interface.

The quality of transmission over the PC-5 interface is reflected through the second information indirectly; when the first power difference indicated by the second information is small, meanwhile the performance on the PC-5 interface is not good, it is indicated that the transmitting terminal of V2X cannot improve the performance on the PC-5 interface through raising power; thus, the base station will improve the performance of transmission over the PC-5 interface by changing the time-frequency resource pool.

The K1 first-type time-frequency resource pools correspond to K1 uplink receiving beams of the base station respectively, and different first-type maximum powers are configured for different uplink receiving beams, which further achieves beamforming gains and increases the reliability and effectiveness of the scheme proposed in the disclosure; meanwhile, when the PC-5 interface also maintains multiple beams, the second reference signal is only one beam among multiple beams, which further achieves beamforming gains and increases the reliability and effectiveness of the scheme proposed in the disclosure.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
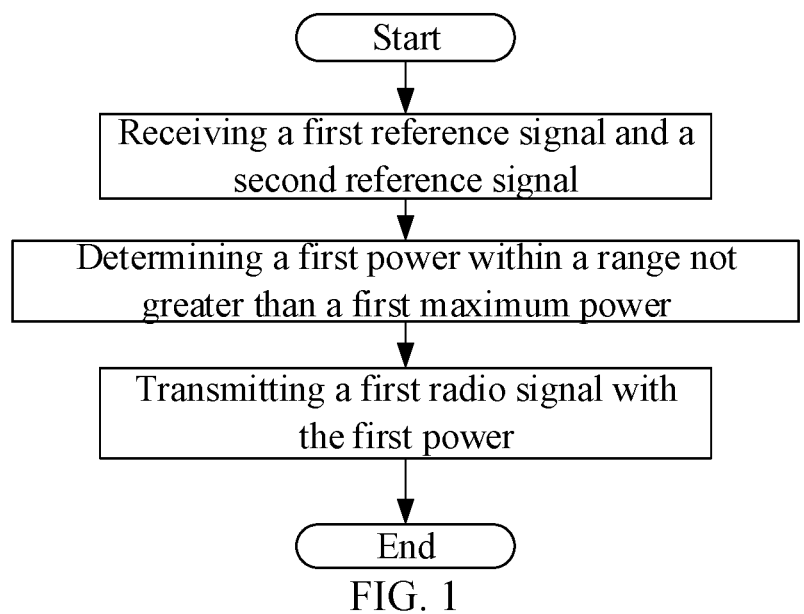
FIG. 1 is a flowchart of a first reference signal according to one embodiment of the disclosure.

Embodiment 1 illustrates a flowchart of a first reference signal, as shown in FIG. 1.

In Embodiment 1, the first node in the disclosure first receives a first reference signal and a second reference signal, then determines a first power within a range not greater than a first maximum power, and finally transmits a first radio signal with the first power; wherein the first maximum power is related to a measurement result against the first reference signal and is not related to a measurement result against the second reference signal; the first power is related to the measurement result against the second reference signal.

In one embodiment, a transmitter of the first reference signal and a transmitter of the second reference signal are non co-located.

In one embodiment, the first node is one terminal.

In one embodiment, the first node is one UE.

In one embodiment, the first node is one vehicle.

In one embodiment, the first node is one Road Side Unit (RSU).

In one embodiment, a transmitter of the first reference signal is one base station.

In one embodiment, a transmitter of the first reference signal provides cellular services to the first node.

In one embodiment, a transmitter of the first reference signal is a base station corresponding to a cell that provides services to the first node.

In one embodiment, a transmitter of the second reference signal is one terminal equipment.

In one embodiment, a transmitter of the second reference signal is one UE.

In one embodiment, a transmitter of the second reference signal is one vehicle.

In one embodiment, a transmitter of the second reference signal is one RSU.

In one embodiment, a transmitter of the first reference signal is a second node, a receiver of the first radio signal includes a third node, the second node and the third node are non co-located.

In one embodiment, the phrase that the second node and the third node are non co-located includes: the second node and the third node are two different communication equipments.

In one embodiment, the phrase that the second node and the third node are non co-located includes: the second node and the third node have no wired connection therebetween.

In one embodiment, the phrase that the second node and the third node are non co-located includes: the second node and the third node are at different locations.

In one embodiment, the phrase that the second node and the third node are non co-located includes: the second node is one base station, and the third node is a communication equipment beyond the base station.

In one embodiment, the phrase that the second node and the third node are non co-located includes: the second node and the third node correspond to different identifiers.

In one embodiment, the first reference signal is transmitted over a Uu interface, and the second reference signal is transmitted over a PC5 interface.

In one embodiment, the first reference signal includes at least one of a Primary Synchronization Signal (PSS), a Secondary Synchronization Signal (SSS), a Channel State Information Reference Signal (CSI-RS), a Tracking Reference Signal (TRS) or a Phase Tracking Reference Signal (PTRS).

In one embodiment, the first reference signal includes a Synchronization Signal Block (SSB).

In one embodiment, the second reference signal includes at least one of a Primary Sidelink Synchronization Signal (PSSS), a Secondary Sidelink Synchronization Signal (SSSS), a Physical Sidelink Discovery Channel (PSDCH), a Demodulation Reference Signal (DMRS) or a Discovery Reference Signal (DRS).

In one embodiment, the second reference signal includes a CSI-RS for a PC-5 interface.

In one embodiment, the first maximum power is in unit of Watt (W), or the first maximum power is in unit of milliwatt (mW), or the first maximum power is in unit of milli-decibel (dBm).

In one embodiment, the first power is in unit of Watt (W), or the first power is in unit of milliwatt (mW), or the first power is in unit of milli-decibel (dBm).

In one embodiment, a physical layer channel occupied by the first radio signal includes a Physical Sidelink Shared Channel (PSSCH).

In one embodiment, a physical layer channel occupied by the first radio signal includes a Physical Sidelink Control Channel (PSCCH).

In one embodiment, a physical layer channel occupied by the first radio signal includes a PSDCH.

In one embodiment, a transport layer channel occupied by the first radio signal is a Sidelink Shared Channel (SL-SCH).

In one embodiment, within the range not greater than the first maximum power, the first node determines the first power autonomously (without standardization).

In one embodiment, within the range not greater than the first maximum power, with other same conditions, the worse the quality of reception of the second reference signal, the higher the first power.

In one subembodiment, the other conditions include a Transport Block Size (TBS) corresponding to the first radio signal.

In one subembodiment, the other conditions include a number and a position of Resource Elements (REs) occupied by the first radio signal.

In one subembodiment, the other conditions include an antenna port employed to transmit the first radio signal.

In one embodiment, the measurement result against the first reference signal includes a path loss of the first reference signal.

In one embodiment, the measurement result against the first reference signal includes a path loss, determined by the first node according to the received first reference signal, from the transmitter of the first reference signal to the first node.

In one embodiment, the measurement result against the second reference signal includes a path loss of the second reference signal.

In one embodiment, the measurement result against the second reference signal includes a path loss, determined by the first node according to the received second reference signal, from the transmitter of the second reference signal to the first node.

In one embodiment, the measurement result against the first reference signal includes an Reference Signal Received Power (RSRP) of the first reference signal.

In one embodiment, the measurement result against the first reference signal includes at least one of a Reference Signal Received Quality (RSRQ), a Received Signal Strength Indicator (RSSI) or a Signal to Noise Rate (SNR).

In one embodiment, the measurement result against the second reference signal includes an RSRP of the second reference signal.

In one embodiment, the measurement result against the second reference signal includes at least one of an RSRQ, an RSSI or an SNR.

In one embodiment, the first maximum power is in linear correlation with the measurement result against the first reference signal.

In one subembodiment, the phrase that the first maximum power is in linear correlation with the measurement result against the first reference signal includes: the first maximum power is determined by the following formula:

$$P^{MAX} = 10\log(M) + P_{1,i} + \alpha_{1,i} \cdot PL_{1,i}$$

where $P^{MAX}$ is the first maximum power; M is related to a bandwidth occupied by the first radio GC signal which is expressed by a number of resource blocks; $P_{1,i}$ is an expected power related to the first reference signal, which is in unit of dB; $\alpha_{1,i}$ is a compensation factor related to the first reference signal, which is a real number not less than 0 but not greater than 1;

and $PL_{1,i}$ is the measurement result against the first reference signal.

In one affiliated embodiment of the above subembodiment, the $P_{1,i}$ is configured through a higher layer signaling.

In one affiliated embodiment of the above subembodiment, the $\alpha_{1,i}$ is configured through a higher layer signaling.

In one affiliated embodiment of the above subembodiment, the above phrase that $P_{1,i}$ is an expected power related to the first reference signal includes: the second node transmits the first reference signal employing a first antenna port group, the first node transmits the first radio signal employing a target antenna port group, the first antenna port group and the target antenna port group are Quasi-colocated (QCLed), and the $P_{1,i}$ is a power expected by the second node at which the first radio signal transmitted by the first node reaches the second node.

In one affiliated embodiment of the above subembodiment, the above phrase that α1,i is a compensation factor related to the first reference signal includes: the second node transmits the first reference signal employing a first antenna port group, the first node transmits the first radio signal employing a target antenna port group, the first antenna port group and the target antenna port group are Quasi-colocated (QCLed), and the ii is a compensation to a path loss calculated against the first reference signal by the first node when transmitting the first radio signal.

In one embodiment, the first maximum power is a smaller one of a first reference maximum power and a first configured power, and the first configured power is in linear correlation with the measurement result against the first reference signal.

In one subembodiment, a relationship between the first maximum power, the first reference power and the first configured power is determined by the following formula:

$$P^{MAX} = \min\{P_{CMAX}, 10\log(M) + P_{1,i} + \alpha_{1,i} \cdot PL_{1,i}\}$$

where $P^{MAX}$ is the first maximum power; PCMAX is the first reference maximum power;

the polynomial $10 \log(M) + P_{1,i} + \alpha_{1,i} \cdot PL_{1,i}$ corresponds to the first configured power; M is related to a bandwidth occupied by the first radio signal which is expressed by a number of resource blocks; $P_{1,i}$ is an expected power related to the first reference signal, which is in unit of dB; $\alpha_{1,i}$ is a compensation factor related to the first reference signal, which is a real number not less than 0 but not greater than 1; and $PL_{1,i}$ is the measurement result against the first reference signal.

In one subembodiment, the $P_{1,i}$ is configured through a higher layer signaling.

In one subembodiment, the $\alpha_{1,i}$ is configured through a higher layer signaling.

In one subembodiment, the first reference maximum power is fixed (non-configurable).

In one subembodiment, the first reference maximum power is configured through a signaling explicitly.

In one subembodiment, the first reference maximum power is configurable.

In one subembodiment, the first reference maximum power is 23 dBm.

In one embodiment, the first maximum power is in linear correlation with a first target power, the first target power is a smaller one of a second reference maximum power and a second configured power, and the second configured power is in linear correlation with the measurement result against the first reference signal.

In one subembodiment, a relationship between the first maximum power, the first target power, the second reference maximum power and the second configured power is determined by the following formula:

$$P^{MAX} = 10\log_{10}\left(\frac{M}{M + 10^{\frac{3}{10}} \times M}\right) + \min\left\{P_C, 10\log_{10}\left(M + 10^{\frac{3}{10}} \times M\right) + P_{1,i} + \alpha_{1,i} PL_{1,i}\right\}$$

where $P^{MAX}$ is the first maximum power; the polynomial $$\min\left\{P_C, 10\log_{10}\left(M + 10^{\frac{3}{10}} \times M\right) + P_{1,i} + \alpha_{1,i} PL_{1,i}\right\}$$

is the first target power; $P_C$ is the second reference maximum power; the polynomial $$10\log_{10}\left(M + 10^{\frac{3}{10}} \times M\right) + P_{1,i} + \alpha_{1,i} PL_{1,i}$$

corresponds to the second configured power; M is related to a bandwidth occupied by the first radio signal which is expressed by a number of resource blocks; $P_{1,i}$ is an expected power related to the first reference signal, which is in unit of dB; $\alpha_{1,i}$ is a compensation factor related to the first reference signal, which is a real number not less than 0 but not greater than 1; and $PL_{1,i}$ is the measurement result against the first reference signal.

In one subembodiment, the $P_{1,i}$ is configured through a higher layer signaling.

In one subembodiment, the $\alpha_{1,i}$ is configured through a higher layer signaling.

In one embodiment, the above phrase that the first maximum power is related to a measurement result against the first reference signal includes: the first maximum power and the measurement result against the first reference signal meet the following formula.

$$P^{MAX} = 10\log_{10}\left(\frac{M}{M + 10^{\frac{3}{10}} \times M_1}\right) + A$$

where $P^{MAX}$ is the first maximum power; M is related to a bandwidth occupied by the first radio signal which is expressed by a number of resource blocks; $M_1$ is equal to 2, or the $M_1$ is related to a bandwidth occupied by a PSCCH scheduling the first radio signal; and the measurement result against the first reference signal is used for determining the polynomial A.

In one subembodiment, an RRC signaling maxTxpower is configured, and the polynomial A is equal to the following formula:

$$A = \min\left\{P_C, P_{MAX\_CBR}, 10\log_{10}\left(M + 10^{\frac{3}{10}} \times M_1\right) + P_{1,l} + \alpha_{1,l}PL_{1,l}\right\}$$

where is the $P_C$ is the $P_{CMAX}$ TS36.213; $P_{MAX\_CBR}$ is configured through the RRC signaling maxTxpower; $P_{1,i}$ is an expected power related to the first reference signal, which is in unit of dB; $\alpha_{1,i}$ is a compensation factor related to the first reference signal, which is a real number not less than 0 but not greater than 1; and $PL_{1,i}$ is the measurement result against the first reference signal.

In one subembodiment, an RRC signaling maxTxpower is not configured, and the polynomial A is equal to the following formula:

$$A = \min\left\{P_C, 10\log_{10}\left(M + 10^{\frac{3}{10}} \times M_1\right) + P_{1,l} + \alpha_{1,l}PL_{1,l}\right\}$$

where $P_C$ is the $P_{CMAX}$ in TS36.213; $P_{1,i}$ is an expected power related to the first reference signal, which is in unit of dB; $\alpha_{1,i}$ is a compensation factor related to the first reference signal, which is a real number not less than 0 but not greater than 1; and $PL_{1,i}$ is the measurement result against the first reference signal.

In one affiliated embodiment of the above two subembodiments, the $P_{1,i}$ is configured through a higher layer signaling.

In one affiliated embodiment of the above two subembodiments, the $\alpha_{1,i}$ is configured through a higher layer signaling.

In one embodiment, the first power is a smaller one of a first maximum power and a second power, and the second power is in linear correlation with the measurement result against the second reference signal.

In one subembodiment, the second power is equal to a polynomial 10 $\log(M_2) + P_{2,j} + \alpha_{2,j} \cdot PL_{2,j}$. $M_2$ is related to a bandwidth occupied by the first radio signal which is expressed by a number of resource blocks; $P_{2,j}$ is an expected power related to the first radio signal, which is in unit of dB; $\alpha_{2,j}$ is a compensation factor related to the second reference signal, which is a real number not less than 0 but not greater than 1; and $PL_{2,j}$ is the measurement result against the second reference signal.

In one embodiment, a spatial receiving parameter for the first reference signal is used for determining a transmitting antenna port group of the first radio signal.

In one embodiment, a spatial receiving parameter for the second reference signal is used for determining a transmitting antenna port group of the first radio signal.

In one embodiment, the first node receives the first reference signal and the second reference signal employing same spatial receiving parameters.

In one embodiment, the first reference signal and the first radio signal are QCLed.

In one embodiment, the second reference signal and the first radio signal are QCLed.

In one embodiment, the first radio signal is an interference signal for the second node.

In one embodiment, the second node does not know time domain resources occupied by the first radio signal.

In one embodiment, the second node does not know frequency domain resources occupied by the first radio signal.

Embodiment 2

Figure 2:
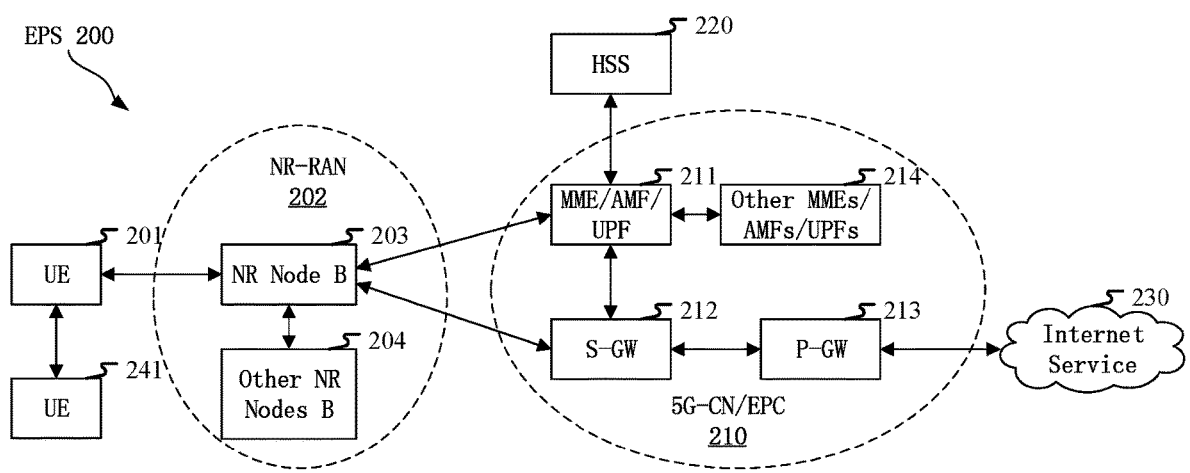
FIG. 2 is a diagram illustrating a network architecture according to one embodiment of the disclosure.

Embodiment 2 illustrates a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, one UE 241 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the gNB 203 corresponds to the second node in the disclosure.

In one embodiment, the UE 241 corresponds to the third node in the disclosure.

In one embodiment, the air interface between the UE 201 and the gNB 203 is a Uu interface.

In one embodiment, the air interface between the UE 201 and the UE 241 is a PC-5 interface.

In one embodiment, the radio link between the UE 201 and the gNB 203 is a cellular network link.

In one embodiment, the radio link between the UE 201 and the UE 241 is a sidelink.

In one embodiment, the first node in the disclosure is the UE 201, and the third node in the disclosure is one terminal in the coverage of the gNB 203.

In one embodiment, the first node in the disclosure is the UE 201, and the third node in the disclosure is one terminal out of the coverage of the gNB 203.

In one embodiment, the first node and the third node in the disclosure are both served by the gNB 203.

In one embodiment, the UE 201 supports beamforming transmission.

In one embodiment, the UE 241 supports beamforming transmission.

In one embodiment, the gNB 203 supports beamforming transmission.

In one embodiment, unicast transmission is supported between the UE 201 and the UE 241.

In one embodiment, non-broadcast transmission is supported between the UE 201 and the UE 241.

In one embodiment, non-groupcast transmission is supported between the UE 201 and the UE 241.

Embodiment 3

Figure 3:
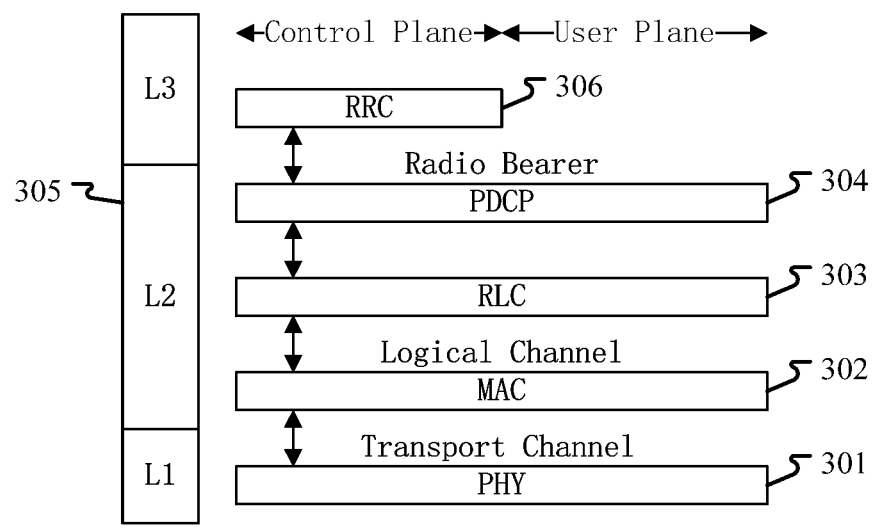
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the base station in the disclosure.

In one embodiment, the first reference signal in the disclosure is generated on the PHY 301.

In one embodiment, the second reference signal in the disclosure is generated on the PHY 301.

In one embodiment, the first radio signal in the disclosure is generated on the PHY 301.

In one embodiment, the first radio signal in the disclosure is generated on the MAC sublayer 302.

In one embodiment, the first information in the disclosure is generated on the MAC sublayer 302.

In one embodiment, the first information in the disclosure is generated on the RRC sublayer 306.

In one embodiment, the second information in the disclosure is generated on the MAC sublayer 302.

In one embodiment, the second information in the disclosure is generated on the RRC sublayer 306.

In one embodiment, any one of the K1 first-type radio signals in the disclosure is generated on the MAC sublayer 302.

In one embodiment, any one of the K1 first-type radio signals in the disclosure is generated on the PHY 301.

In one embodiment, any one of the M2 second-type radio signals in the disclosure is generated on the MAC sublayer 302.

In one embodiment, any one of the M2 second-type radio signals in the disclosure is generated on the PHY 301.

Embodiment 4

Figure 4:
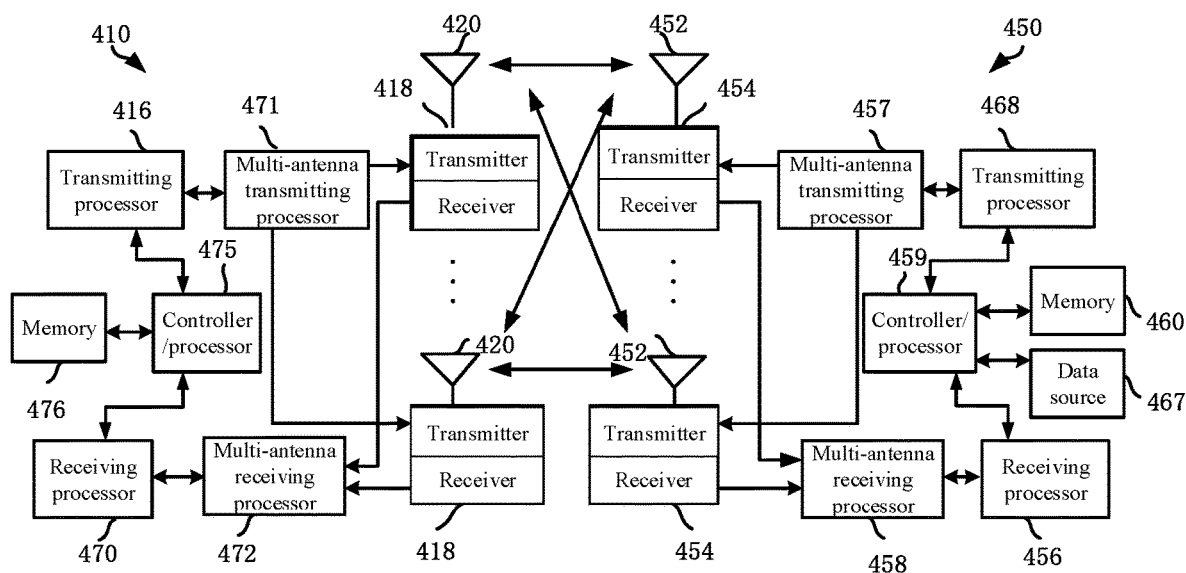
FIG. 4 is a diagram illustrating a first communication node and a second communication node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first reference signal and a second reference signal, then determines a first power within a range not greater than a first maximum power, and finally transmits a first radio signal with the first power; wherein the first maximum power is related to a measurement result against the first reference signal and is not related to a measurement result against the second reference signal; the first power is related to the measurement result against the second reference signal.

In one embodiment, the first communication equipment 450 includes a memory that stores a computer readable instruction program. The computer readable instruction program generates an action when executed by at least one processor. The action includes: receiving a first reference signal and a second reference signal, then determining a first power within a range not greater than a first maximum power, and finally transmitting a first radio signal with the first power; wherein the first maximum power is related to a measurement result against the first reference signal and is not related to a measurement result against the second reference signal; the first power is related to the measurement result against the second reference signal.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first reference signal; wherein a receiver of the first reference signal includes a first node, and the first node receives a second reference signal; a first maximum power is related to a measurement result against the first reference signal and is not related to a measurement result against the second reference signal; a first power is related to the measurement result against the second reference signal; the first node determines the first power within a range not greater than the first maximum power, and the first node transmits a first radio signal with the first power; and a receiver of the first radio signal includes a transmitter of the second reference signal.

In one embodiment, the second communication equipment 410 includes a memory that stores a computer readable instruction program. The computer readable instruction program generates an action when executed by at least one processor. The action includes: transmitting a first reference signal; wherein a receiver of the first reference signal includes a first node, and the first node receives a second reference signal; a first maximum power is related to a measurement result against the first reference signal and is not related to a measurement result against the second reference signal; a first power is related to the measurement result against the second reference signal; the first node determines the first power within a range not greater than the first maximum power, and the first node transmits a first radio signal with the first power; and a receiver of the first radio signal includes a transmitter of the second reference signal.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a second reference signal and receives a first radio signal; wherein a transmitter of the first radio signal receives a first reference signal and the second reference signal, a first maximum power is related to a measurement result against the first reference signal and is not related to a measurement result against the second reference signal; a first power is related to the measurement result against the second reference signal; a transmitter of the first radio signal determines the first power within a range not greater than the first maximum power, and transmits the first radio signal with the first power; and a transmitter of the first reference signal and the third node are non co-located.

In one embodiment, the second communication equipment 410 includes a memory that stores a computer readable instruction program. The computer readable instruction program generates an action when executed by at least one processor. The action includes: transmitting a second reference signal and receiving a first radio signal; wherein a transmitter of the first radio signal receives a first reference signal and the second reference signal, a first maximum power is related to a measurement result against the first reference signal and is not related to a measurement result against the second reference signal; a first power is related to the measurement result against the second reference signal; a transmitter of the first radio signal determines the first power within a range not greater than the first maximum power, and transmits the first radio signal with the first power; and a transmitter of the first reference signal and the third node are non co-located.

In one embodiment, the first communication equipment 450 corresponds to the first node in the disclosure.

In one embodiment, the second communication equipment 410 corresponds to the second node in the disclosure.

In one embodiment, the second communication equipment 410 corresponds to the third node in the disclosure.

In one embodiment, at least one of the antenna 452, the receiver 454, the multiantenna receiving processor 458 or the receiving processor 456 is used for receiving the first reference signal and the second reference signal in the disclosure; and at least one of the antenna 420, the transmitter 418, the multiantenna transmitting processor 471 or the transmitting processor 416 is used for transmitting the first reference signal and the second reference signal in the disclosure.

In one embodiment, at least one of the transmitter 454, the transmitting processor 468 or the controller/processor 459 is used for determining the first power in the disclosure within a range not greater than the first maximum power in the disclosure.

In one embodiment, at least one of the antenna 452, the transmitter 454, the multiantenna transmitting processor 457 or the transmitting processor 468 is used for transmitting the first radio signal in the disclosure with the first power in the disclosure; and at least one of the antenna 420, the receiver 418, the multiantenna receiving processor 472 or the receiving processor 470 is used for receiving the first radio signal in the disclosure.

In one embodiment, at least one of the antenna 452, the receiver 454, the multiantenna receiving processor 458 or the receiving processor 456 is used for receiving the first information in the disclosure; and at least one of the antenna 420, the transmitter 418, the multiantenna transmitting processor 471 or the transmitting processor 416 is used for transmitting the first information in the disclosure.

In one embodiment, at least one of the antenna 452, the transmitter 454, the multiantenna transmitting processor 457 or the transmitting processor 468 is used for transmitting the second information in the disclosure; and at least one of the antenna 420, the receiver 418, the multiantenna receiving processor 472 or the receiving processor 470 is used for receiving the second information the disclosure.

In one embodiment, at least one of the antenna 452, the receiver 454, the multiantenna receiving processor 458 or the receiving processor 456 is used for receiving the K1 first-type radio signals in the disclosure; and at least one of the antenna 420, the transmitter 418, the multiantenna transmitting processor 471 or the transmitting processor 416 is used for transmitting the K1 first-type radio signals in the disclosure.

In one embodiment, at least one of the antenna 452, the receiver 454, the multiantenna receiving processor 458 or the receiving processor 456 is used for receiving the M1 second-type radio signals in the disclosure; and at least one of the antenna 420, the transmitter 418, the multiantenna transmitting processor 471 or the transmitting processor 416 is used for transmitting the M1 second-type radio signals in the disclosure.

Embodiment 5

Figure 5:
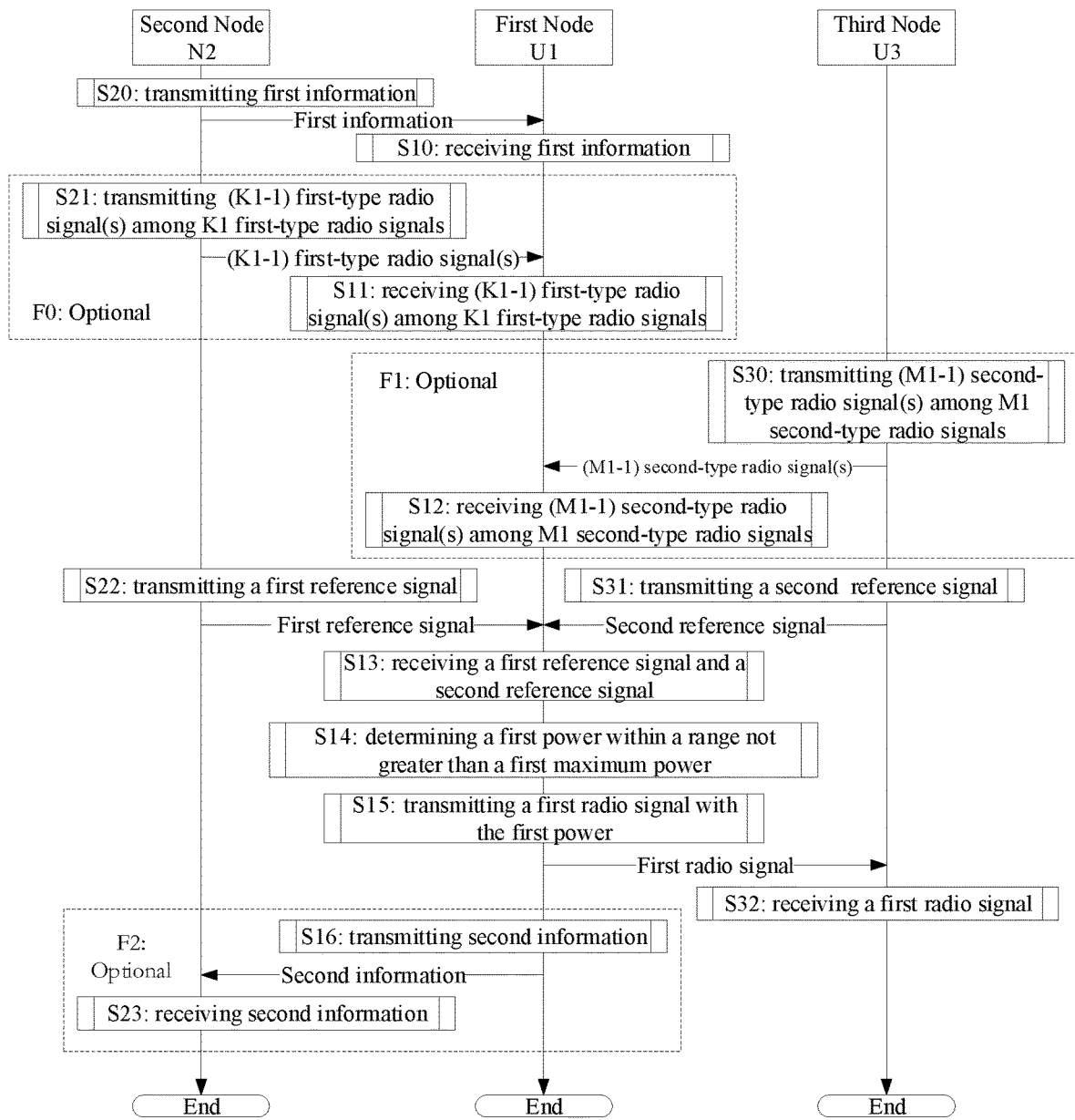
FIG. 5 is a flowchart of a first radio signal according to one embodiment of the disclosure.

Embodiment 5 illustrates a flowchart of a first radio signal, as shown in FIG. 5. In FIG. 5, a first node U1 and a second node U2 perform communication through a sidelink, the first node U1 and a third node N3 perform communication through a Uu interface. Steps in boxes F0, F1 and F2 are optional.

The first node U1 receives first information in S10, receives (K1-1) first-type radio signal(s) among K1 first-type radio signals in S11, receives (M1-1) second-type radio signal(s) among M1 second-type radio signals in S12, receives a first reference signal and a second reference signal in S13, determines a first power within a range not greater than a first maximum power in S14, transmits a first radio signal with the first power in S15, and transmits second information in S16.

The second node N2 transmits first information in S20, transmits (K1-1) first-type radio signal(s) among K1 first-type radio signals in S21, transmits a first reference signal in S22, and receives second information in S23.

The third node U3 transmits (M1-1) second-type radio signal(s) among M1 second-type radio signals in S30, transmits a second reference signal in S31, and receives a first radio signal in S32.

In Embodiment 5, the first maximum power is related to a measurement result against the first reference signal and is not related to a measurement result against the second reference signal; the first power is related to the measurement result against the second reference signal; the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; the first information is transmitted through an air interface; the K1 is an integer greater than 1; the second information is used for indicating a first power difference, and the first power difference is equal to a difference between the first maximum power and the first power; the second information is transmitted through an air interface; the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; the first reference signal is one first-type radio signal among the K1 first-type radio signals that is corresponding to the first maximum power; and the second reference signal is one second-type radio signal among the M1 second-type radio signals, the M1 is an integer greater than 1.

In one embodiment, the first information is used for indicating time domain resources occupied by the first time-frequency resource pool.

In one embodiment, the first information is used for indicating frequency domain resources occupied by the first time-frequency resource pool.

In one embodiment, the first information is used for indicating time domain resources occupied by any one of K1 first-type time-frequency resource pools.

In one embodiment, the first information is used for indicating frequency domain resources occupied by any one of K1 first-type time-frequency resource pools.

In one embodiment, time domain resources occupied by any two of the K1 first-type time-frequency resource pools are orthogonal.

In one embodiment, the K1 first-type time-frequency resource pools correspond to K1 CSI-RS Resource Indexes (CRIs) respectively.

In one embodiment, the K1 first-type time-frequency resource pools correspond to K1 SRS Resource Indicators (SRIs) respectively.

In one subembodiment, the air interface in the disclosure corresponds to the interface between the UE 201 and the NR node B 203 illustrated in Embodiment 2.

In one subembodiment, the air interface in the disclosure corresponds to the interface between the UE 201 and the UE 241 illustrated in Embodiment 2.

In one subembodiment, the air interface in the disclosure is carried through a radio channel.

In one embodiment, a physical layer channel used for transmitting the second information includes a Physical Uplink Shared Channel (PUSCH).

In one embodiment, a physical layer channel used for transmitting the second information includes a Physical Uplink Control Channel (PUCCH).

In one embodiment, a physical layer channel used for transmitting the second information includes an Uplink Shared Channel (UL-SCH).

In one embodiment, the first node U1 determines whether to transmit the second information according to a channel quality of the first radio signal fed back by the third node U3.

In one subembodiment, a first bit block is used for generating the first radio signal, the first bit block is transmitted Q times by the first node U1, the Q is a positive integer, and none of the Q times of transmissions of the first bit block are correctly received by the third node U3, and the third node U1 transmits the second information.

In one affiliated embodiment of the above subembodiment, the Q is configured through a higher layer signaling, or the Q is fixed.

In one embodiment, the second information is transmitted periodically.

In one embodiment, the second information includes a Power Headroom Report (PHR) for the sidelink.

In one embodiment, the first power difference is a Power Headroom (PH) for the sidelink.

In one embodiment, the K1 first-type radio signals are associated to K1 first-type reference signal resources respectively.

In one embodiment, the first node U1 transmits the first radio signal in the first time-frequency resource pool among the K1 first-type time-frequency resource pools, and the first node U1 uses the first-type maximum power corresponding to the first time-frequency resource pool as the first maximum power.

In one embodiment, any one of the K1 first-type radio signals includes a CSI-RS.

In one embodiment, the K1 first-type radio signals correspond to K1 CRIs respectively.

In one embodiment, the above phrase that the K1 first-type radio signals are used for determining K1 first-type maximum powers respectively includes: the K1 first-type radio signals are used for determining K1 first-type measurement results respectively, and the K1 first-type measurement results are used for determining the K1 first-type maximum powers respectively.

In one subembodiment, any one of the K1 first-type radio signals includes at least one of a PSS or an SSS.

In one subembodiment, any one of the K1 first-type radio signals includes an SSB.

In one subembodiment, the K1 first-type measurement results are K1 first-type path losses acquired according to the K1 first-type radio signals respectively.

In one affiliated embodiment of the above subembodiment, the phrase that the K1 first-type path losses are used for determining K1 first-type maximum powers respectively include: a given path loss is any one of the K1 first-type path losses, a given first-type maximum power is a first-type maximum power among the K1 first-type maximum powers that is corresponding to the given first-type path loss, and the given first-type path loss is acquired through a given first-type radio signal among the K1 first-type radio signals.

In one example of the above affiliated embodiment, a relationship between the given first-type path loss and the given first-type maximum power can refer to the following formula:

$$P_n^{MAX} = 10\log(M) + P_{1,n} + \alpha_{1,n} \cdot PL_{1,n}$$

where $P_n^{MAX}$ is the given first-type maximum power; M is related to a bandwidth occupied by the first radio signal which is expressed by a number of resource blocks; $P_{1,n}$ is an expected power related to the given first-type radio signal which is in unit of dB; $\alpha_{1,n}$ is a compensation factor related to the given first-type radio signal, which is a real number not less than 0 but not greater than 1; and $PL_{1,n}$ is the given first-type path loss, and the subscript n is a positive integer greater than 0 but not greater than K1.

In one example of the above affiliated embodiment, a relationship between the given first-type path loss and the given first-type maximum power can refer to the following formula:

$$P_n^{MAX} = \min\{P_{CMAX}, 10\log(M) + P_{1,n} + \alpha_{1,n} \cdot PL_{1,n}\}$$

where $P_n^{MAX}$ is the given first-type maximum power; $P_{CMAX}$ is the first reference maximum power in the disclosure; M is related to a bandwidth occupied by the first radio signal which is expressed by a number of resource blocks; $P_{1,n}$ is an expected power related to the given first-type radio signal which is in unit of dB; $\alpha_{1,n}$ is a compensation factor related to the given first-type radio signal, which is a real number not less than 0 but not greater than 1; and $PL_{1,n}$ is the given first-type path loss, and the subscript n is a positive integer greater than 0 but not greater than K1.

In one example of the above affiliated embodiment, a relationship between the given first-type path loss and the given first-type maximum power can refer to the following formula:

$$P_n^{MAX} = 10\log_{10}\left(\frac{M}{M + 10^{\frac{3}{10}} \times M}\right) + \min\left\{P_C, 10\log_{10}\left(M + 10^{\frac{3}{10}} \times M\right) + P_{1,n} + \alpha_{1,n} PL_{1,n}\right\}$$

where $P_n^{MAX}$ is the given first-type maximum power; $P_C$ is the second reference maximum power in the disclosure; M is related to a bandwidth occupied by the first radio signal which is expressed by a number of resource blocks; $P_{1,n}$ is an expected power related to the given first-type radio signal which is in unit of dB; $\alpha_{1,n}$ is a compensation factor related to the given first-type radio signal, which is a real number not less than 0 but not greater than 1; and $PL_{1,n}$ is the given first-type path loss, and the subscript n is a positive integer greater than 0 but not greater than K1.

In one example of the above affiliated embodiment, a relationship between the given first-type path loss and the given first-type maximum power can refer to the following formula:

$$P_n^{MAX} = 10\log_{10}\left(\frac{M}{M + 10^{\frac{3}{10}} \times M}\right) + A$$

where $P_n^{MAX}$ is the given first-type maximum power; and M is related to a bandwidth occupied by the first radio signal which is expressed by a number of resource blocks.

In one exception of the above example, an RRC signaling maxTxpower is configured, and the polynomial A is equal to the following formula:

$$A = \min\left\{P_C, P_{MAX\_CBR}, 10\log_{10}\left(M + 10^{\frac{3}{10}} \times M_1\right) + P_{1,n} + \alpha_{1,n}PL_{1,n}\right\}$$

where $P_C$ is the $P_{CMAX}$ in TS36.213, $P_{MAX\_CBR}$ is configured through the RRC signaling maxTxpower, $P_{1,n}$ is an expected power related to the given first-type radio signal which is in unit of dB; $\alpha_{1,n}$ is a compensation factor related to the given first-type radio signal, which is a real number not less than 0 but not greater than 1; and $PL_{1,n}$ is the given first-type path loss, and the subscript n is a positive integer greater than 0 but not greater than K1.

In one exception of the above example, an RRC signaling maxTxpower is not configured, and the polynomial A is equal to the following formula:

$$A = \min\left\{P_C, 10\log_{10}\left(M + 10^{\frac{3}{10}} \times M_1\right) + P_{1,n} + \alpha_{1,n}PL_{1,n}\right\}$$

where is $P_C$ the $P_{CMAX}$ in TS36.213, $P_{1,n}$ is an expected power related to the given first-type radio signal which is in unit of dB; $\alpha_{1,n}$ is a compensation factor related to the given first-type radio signal, which is a real number not less than 0 but not greater than 1; and $PL_{1,n}$ is the given first-type path loss, and the subscript n is a positive integer greater than 0 but not greater than K1.

In one embodiment, the above phrase that the K1 first-type maximum powers are associated to the K1 first-type time-frequency resource pools respectively includes: a given first-type maximum power is any one of the K1 first-type maximum powers, and the given first-type maximum power is related to a given first-type time-frequency resource pool among the K1 first-type time-frequency resource pools; the first node U1 transmits a radio signal specific to sidelink in the given first-type time-frequency resource pool with a transmitting power not greater than the given first-type maximum power.

In one embodiment, the K1 first-type radio signals are associated to the K1 first-type time-frequency resource pools respectively.

In one subembodiment, the above phrase that the K1 first-type radio signals are associated to the K1 first-type time-frequency resource pools respectively includes: a given first-type radio signal is any one of the K1 first-type radio signals, and the given first-type radio signal is associated to a given first-type time-frequency resource pool among the K1 first-type time-frequency resource pools; the second node N2 receives a radio signal in the given first-type time-frequency resource pool employing a given spatial receiving parameter, and the second node N2 transmits the given first-type radio signal employing a given first-type antenna port group; the given first-type antenna port group is used for determining the given spatial receiving parameter, or the given spatial receiving parameter is used for determining the given first-type antenna port group.

In one subembodiment, the above phrase that the K1 first-type radio signals are associated to the K1 first-type time-frequency resource pools respectively includes: a given first-type radio signal is any one of the K1 first-type radio signals, and the given first-type radio signal is associated to a given first-type time-frequency resource pool among the K1 first-type time-frequency resource pools; a radio signal received in the given first-type time-frequency resource pool by the second node N2 is QCLed with the given first-type radio signal.

In one subembodiment, the phrase that the two radio signals in the disclosure are QCLed includes: partial or all large-scale properties of one radio signal can be deduced from partial or all large-scale properties of the other radio signal; and the large-scale properties include one or more of delay spread, doppler spread, doppler shift, path loss or average gain.

In one embodiment, M1 second-type radio signals are associated to M1 second-type reference signal resources respectively.

In one embodiment, a physical layer channel occupied by any one of the $M_1$ second-type radio signals includes a PSDCH.

In one embodiment, any one of the M1 second-type radio signals includes at least one of a PSSS and an SSSS.

In one embodiment, any one of the M1 second-type radio signals includes a Discovery Reference Signal (DRS).

In one embodiment, the M1 second-type radio signals are all transmitted on sidelink.

Embodiment 6

Figure 6:
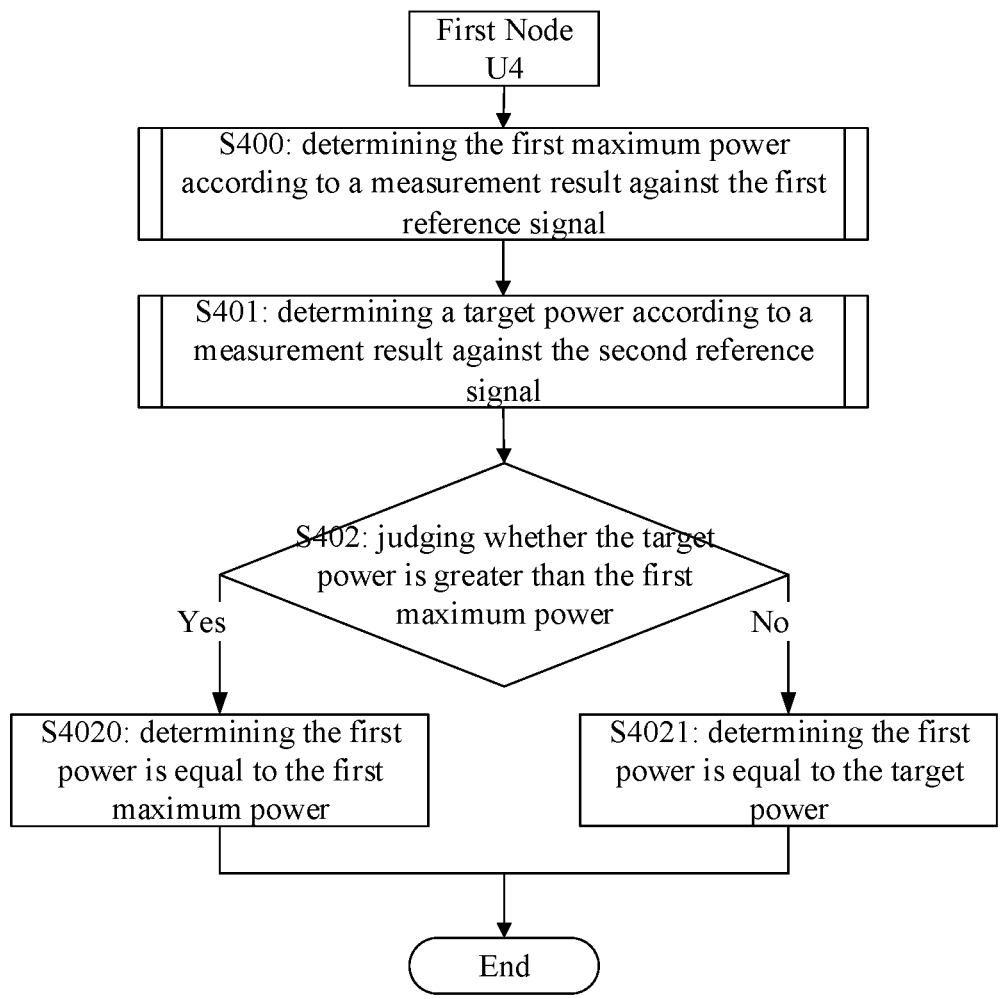
FIG. 6 is a flowchart of determining a first power according to one embodiment of the disclosure.

Embodiment 6 illustrates a flowchart of determining a first power, as shown in FIG. 6. In FIG. 6, the first node U4 performs the following steps to determine the first power in the disclosure within a range not greater than the first maximum power in the disclosure.

S400: determining the first maximum power according to a measurement result against the first reference signal.

S401: determining a target power according to a measurement result against the second reference signal.

S402: judging whether the target power is greater than the first maximum power.

S4020: when the target power is greater than the first maximum power, determining the first power is equal to the first maximum power; or S4021: when the target power is not greater than the first maximum power, determining the first power is equal to the target power.

In one embodiment, all steps in Embodiment 6 correspond to the S14 in Embodiment 5.

In one embodiment, the target power is the second power in the disclosure.

Embodiment 7

Figure 7:
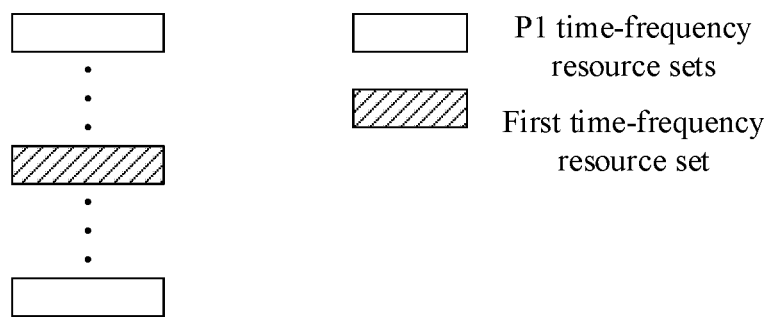
FIG. 7 is a diagram illustrating a first time-frequency resource pool according to one embodiment of the disclosure.

Embodiment 7 illustrates a diagram of one first time-frequency resource pool, as shown in FIG. 7. In FIG. 7, the first time-frequency resource pool includes P1 time-frequency resource sets, and the P1 is a positive integer; the first time-frequency resource set in the disclosure is one of the P1 time-frequency resource sets.

In one embodiment, any one of the P1 time-frequency resource sets occupies one timeslot in time domain.

In one embodiment, any one of the P1 time-frequency resource sets occupies a bandwidth corresponding to a positive integer number of Resource Blocks (RBs) in frequency domain.

In one embodiment, the first time-frequency resource set occupies a positive integer number of REs.

In one embodiment, the first time-frequency resource set is indicated through a dynamic signaling.

In one subembodiment, the dynamic signaling is Sidelink Control Information (SCI).

In one embodiment, the first radio signal in the disclosure occupies all REs in the first time-frequency resource set.

In one embodiment, the first radio signal in the disclosure occupies partial REs in the first time-frequency resource set.

Embodiment 8

Figure 8:
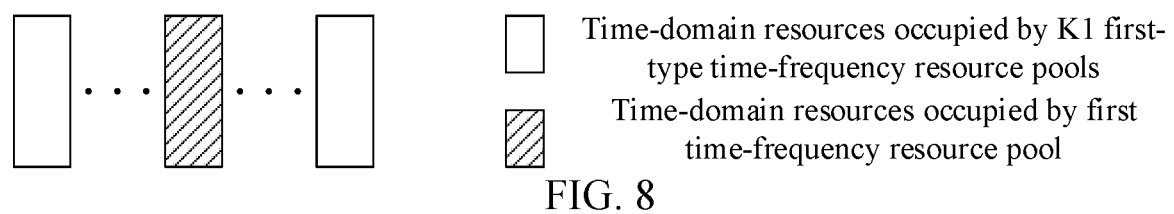
FIG. 8 is a diagram illustrating K1 first-type time-frequency resource pools according to one embodiment of the disclosure.

Embodiment 8 illustrates a diagram of K1 first-type time-frequency resource pools, as shown in FIG. 8. In FIG. 8, the first time-frequency resource pool in the disclosure is one of the K1 first-type time-frequency resource pools.

In one embodiment, any one of the K1 first-type time-frequency resource pools includes a positive integer number of RBs.

In one embodiment, the K1 first-type time-frequency resource pools are periodically distributed in time domain.

In one embodiment, the K1 first-type time-frequency resource pools are all configured for transmission of sidelink.

In one embodiment, any two of the K1 first-type time-frequency resource pools occupy orthogonal time domain resources.

In one embodiment, no time domain resource occupied by one multicarrier symbol belongs to two of the K1 first-type time-frequency resource pools simultaneously.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC).

In one embodiment, the multicarrier symbol in the disclosure is an OFDM including a Cyclic Prefix (CP).

In one embodiment, the multicarrier symbol in the disclosure is a Discrete Fourier Transform Spreading Orthogonal Frequency Division Multiplexing (DFT-s-OFDM) including a CP.

In one embodiment, the multicarrier symbol in the disclosure is a Discrete Fourier Transform Spreading Frequency Division Multiple Access (DFT-S-FDMA).

Embodiment 9

Figure 9:
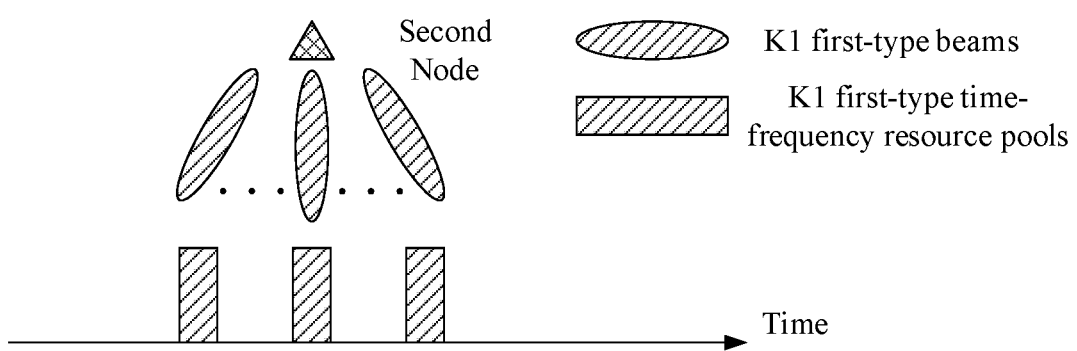
FIG. 9 is a diagram illustrating K1 first-type radio signals according to one embodiment of the disclosure.

Embodiment 9 illustrates a diagram of K1 first-type radio signals, as shown in FIG. 9. In FIG. 9, the K1 first-type radio signals are transmitted employing K1 first-type antenna port groups respectively, and the K1 first-type antenna port groups correspond to K1 spatial receiving parameters respectively; the K1 first-type beams shown in FIG. 9 correspond respectively to K1 transmitting beamforming vectors corresponding respectively to K1 first-type antenna port groups, or the K1 first-type beams shown in FIG. 9 correspond respectively to K1 receiving beamforming vectors formed respectively by K1 spatial receiving parameters; the K1 first-type radio signals correspond to the K1 first-type time-frequency resources in the disclosure respectively; and the first radio signal in the disclosure is transmitted by a target antenna port group.

In one embodiment, at least one of the K1 first-type antenna port groups corresponds to a transmitting beamforming vector which is related to a transmitting beamforming vector corresponding to the target antenna port group.

In one embodiment, at least one of the K1 spatial receiving parameters corresponds to a receiving beamforming vector which is related to a transmitting beamforming vector corresponding to the target antenna port group.

In one embodiment, any one of the K1 first-type antenna port groups corresponds to a transmitting beamforming vector which is related to a transmitting beamforming vector corresponding to the target antenna port group.

In one embodiment, any one of the K1 spatial receiving parameters corresponds to a receiving beamforming vector which is related to a transmitting beamforming vector corresponding to the target antenna port group.

In one embodiment, at least one of the K1 spatial receiving parameters corresponds to a receiving beamforming vector which is related to a transmitting beamforming vector corresponding to the target antenna port group.

In one embodiment, any one of the K1 first-type antenna port groups corresponds to a transmitting beamforming vector that covers a spatial range overlapping with a spatial range covered by a transmitting beamforming vector corresponding to the target antenna port group.

In one embodiment, at least one of the K1 first-type antenna port groups corresponds to a transmitting beamforming vector that covers a spatial range overlapping with a spatial range covered by a transmitting beamforming vector corresponding to the target antenna port group.

In one embodiment, any one of the K1 spatial receiving parameters corresponds to a receiving beamforming vector that covers a spatial range overlapping with a spatial range covered by a transmitting beamforming vector corresponding to the target antenna port group.

In one embodiment, at least one of the K1 spatial receiving parameters corresponds to a receiving beamforming vector that covers a spatial range overlapping with a spatial range covered by a transmitting beamforming vector corresponding to the target antenna port group.

In one embodiment, the beamforming vector in the disclosure includes at least one of an analog beamforming vector, a digital beamforming vector, an analog beamforming matrix or a digital beamforming matrix.

Embodiment 10

Figure 10:
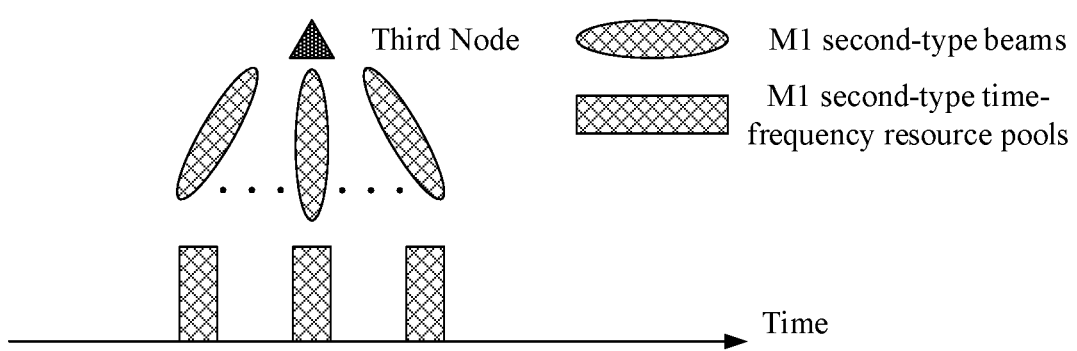
FIG. 10 is a diagram illustrating M1 second-type radio signals according to one embodiment of the disclosure.

Embodiment 10 illustrates a diagram of M1 second-type radio signals, as shown in FIG. 10. In FIG. 10, the M1 second-type radio signals are transmitted employing M1 second-type antenna port groups respectively, and the M1 second-type antenna port groups correspond to M1 spatial receiving parameters respectively; the M1 second-type beams shown in FIG. 10 correspond respectively to M1 transmitting beamforming vectors corresponding respectively to M1 second-type antenna port groups, or the M1 second-type beams shown in FIG. 10 correspond respectively to M1 receiving beamforming vectors formed respectively by M1 spatial receiving parameters.

In one embodiment, the M1 second-type radio signals correspond to M1 second-type time-frequency resource pools respectively.

In one subembodiment, any two of the M1 second-type time-frequency resource pools are orthogonal in time domain.

In one embodiment, the second reference signal in the disclosure is one of the M1 second-type radio signals, and a second-type antenna port group employed by the third node to transmit the second reference signal is used for generating a spatial receiving parameter for receiving the first radio signal in the disclosure.

Embodiment 11

Figure 11:
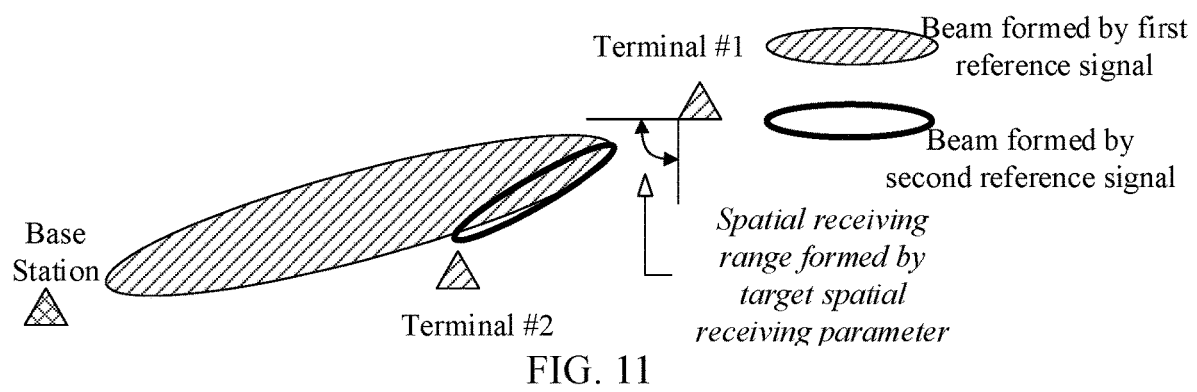
FIG. 11 is a diagram illustrating a first reference signal and a second reference signal according to one embodiment of the disclosure.

Embodiment 11 illustrates a diagram of a first reference signal and a second reference signal, as shown in FIG. 11. In FIG. 11, a base station transmits the first reference signal, a terminal #2 transmits the second reference signal, a terminal #1 receives the first reference signal and the second reference signal employing a target spatial receiving parameter and transmits the first radio signal in the disclosure employing a target antenna port group corresponding to the target spatial receiving parameter.

In one embodiment, the terminal #1 receives the first reference signal and the second reference signal employing a same antenna port group.

In one embodiment, the target spatial receiving parameter is used for determining the target antenna port group.

In one embodiment, a transmitting beamforming vector corresponding to the first reference signal is related to a transmitting beamforming vector corresponding to the first radio signal.

In one embodiment, a transmitting beamforming vector corresponding to the second reference signal is related to a transmitting beamforming vector corresponding to the first radio signal.

In one embodiment, a transmitting beamforming vector corresponding to the second reference signal covers a spatial range which is overlapping with a spatial range covered by a transmitting beamforming vector corresponding to the first radio signal.

In one embodiment, a transmitting beamforming vector corresponding to the second reference signal covers a spatial range which is overlapping with a spatial range covered by a transmitting beamforming vector corresponding to the first radio signal.

In one embodiment, a receiving beamforming vector corresponding to the target spatial receiving parameter covers a spatial range which is overlapping with a spatial range covered by a transmitting beamforming vector corresponding to the first radio signal.

In one embodiment, the beamforming vector in the disclosure includes at least one of an analog beamforming vector, a digital beamforming vector, an analog beamforming matrix or a digital beamforming matrix.

Embodiment 12

Figure 12:
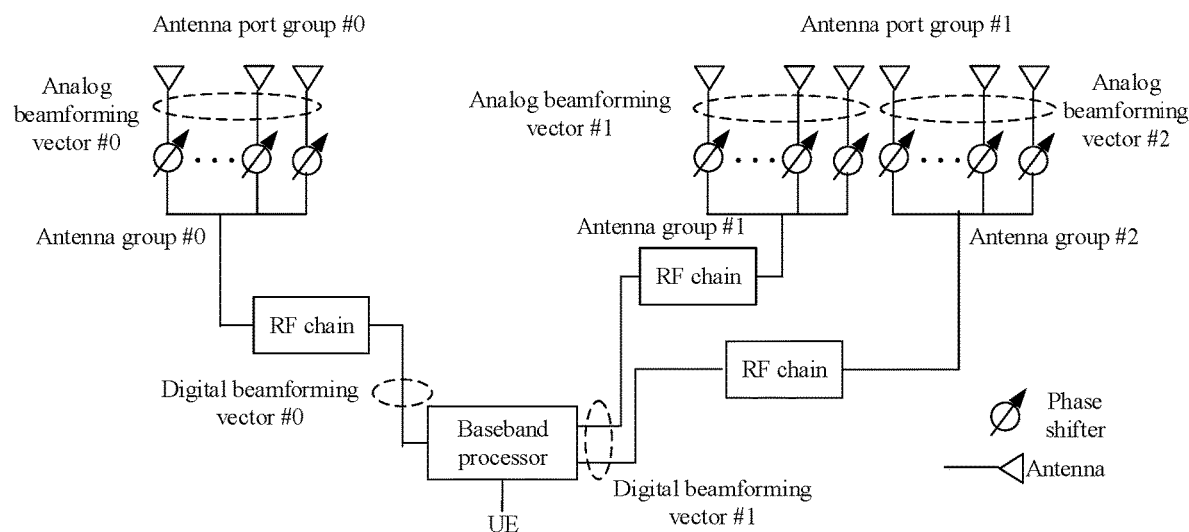
FIG. 12 is a diagram illustrating an antenna port and an antenna port group according to one embodiment of the disclosure.

Embodiment 12 illustrates a diagram of an antenna port and an antenna port group, as shown in FIG. 12.

In Embodiment 12, one antenna port group includes a positive integer number of antenna port(s); one antenna port is formed by antennas in a positive integer number of antenna group(s) through antenna virtualization superposition; one antenna group includes a positive integer number of antenna(s). One antenna group is connected to a baseband processor through one Radio Frequency (RF) chain, and different antenna groups correspond to different RF chains. Mapping coefficients from all antennas in a positive integer number of antenna group(s) included in a given antenna port to the given antenna port constitute a beamforming vector corresponding to the given antenna port. Mapping coefficients from multiple antennas included in any one given antenna group among a positive integer number of antenna group(s) included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 12 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna port, for example, the antenna port group #0 in FIG. 12 includes one antenna port.

Figure 13:
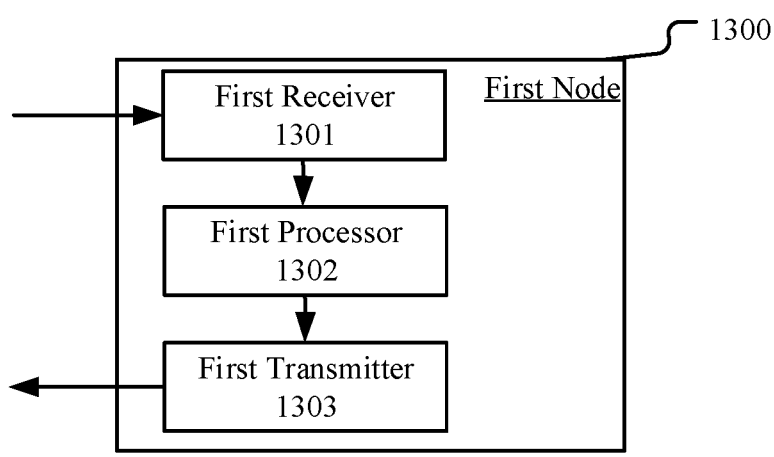
FIG. 13 is a structure block diagram illustrating a processing device in a first node according to one embodiment of the disclosure.

In one subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the corresponding analog beamforming vector of the one antenna port. For example, the digital beamforming vector #0 in FIG. 13 is dimensionally reduced to one scalar, and the beamforming vector corresponding to the antenna port in the antenna port group #0 is the analog beamforming vector #0.

In one embodiment, one antenna port group includes multiple antenna ports, for example, the antenna port group #1 in FIG. 12 includes multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in one antenna port group are QCLed.

In one subembodiment, the phrase that two antenna ports are QCLed refers that: full or partial large-scale properties of a radio signal transmitted on one of the two antenna ports can be deduced from full or partial large-scale properties of a radio signal transmitted on the other one of the two antenna ports, and the large-scale properties include one or more of delay spread, Doppler spread, Doppler shift, path loss or average gain.

In one embodiment, any two antenna ports in one antenna port group are spatially QCLed.

In one embodiment, the K1 first-type radio signals correspond to K1 first-type identifiers respectively, and each one of the K1 first-type identifiers is used for determining one antenna port group.

In one embodiment, the K1 first-type radio signals correspond to K1 first-type identifiers respectively, and the K1 first-type radio signals correspond to K1 first-type reference signal resources respectively, and each one of the K1 first-type identifiers is used for determining one first-type reference signal resource.

In one embodiment, the M1 second-type radio signals correspond to M1 second-type identifiers respectively, and each one of the M1 second-type identifiers is used for determining one antenna port group.

In one embodiment, the M1 second-type radio signals correspond to M1 second-type identifiers respectively, and the M1 second-type radio signals correspond to M1 second-type reference signal resources respectively, and each one of the M1 second-type identifiers is used for determining one second-type reference signal resource.

In one subembodiment, any one of the K1 first-type reference signal resources is used for a channel measurement of a cellular link.

In one subembodiment, any one of the M2 second-type reference signal resources is used for a channel measurement of a sidelink.

In one embodiment, any one of the K1 first-type radio signals employs a same pattern as CSI-RS.

In one embodiment, any one of the M1 second-type radio signals employs a same pattern as CSI-RS.

In one embodiment, any one of the M1 second-type radio signals employs a same pattern as Sounding Reference Signal (SRS).

In one embodiment, any one of the K1 first-type radio signals includes a DMRS.

In one embodiment, any one of the M1 second-type radio signals includes DMRS.

In one embodiment, any one of the K1 first-type radio signals employs a same pattern as DMRS.

In one embodiment, any one of the M1 second-type radio signals employs a same pattern as DMRS.

In one embodiment, the phrase that each one of the K first-type identifiers is used for determining one antenna port group includes: each one of the K first-type identifiers is indicated through a Transmission Configuration Indication (TCI).

In one subembodiment, the TCI is one field in an SCI.

In one embodiment, the phrase that the K1 first-type radio signals correspond to K1 first-type identifiers respectively and each one of the K1 first-type identifiers is used for determining one antenna port group includes: each one of the K1 first-type identifiers is indicated through an SRI.

In one subembodiment, the SRI is one field in an SCI.

In one embodiment, the antenna port group in the disclosure includes a positive integer number of antenna port(s).

In one embodiment, the antenna port group in the disclosure corresponds to one group of RS resources.

In one subembodiment, the RS is used for a channel measurement on a sidelink.

In one subembodiment, the RS is used for a channel measurement of a radio signal between terminals.

In one subembodiment, the RS is used for a channel measurement on a cellular link.

In one subembodiment, the RS is used for a channel measurement of a radio signal between a base station and a terminal.

In one subembodiment, the RS includes a CSI-RS.

In one subembodiment, the RS includes a DMRS.

In one subembodiment, the RS includes an SRS.

Embodiment 13

Embodiment 13 illustrates a structure block diagram of a processing device in a first node, as shown in FIG. 13. In FIG. 13, the processing device 1300 in the first node mainly includes a first receiver 1301, a first processor 1302 and a first transmitter 1303.

The first receiver 1301 receives a first reference signal and a second reference signal.

The first processor 1302 determines a first power within a range not greater than a first maximum power.

The first transmitter 1303 transmits a first radio signal with the first power.

In Embodiment 13, the first maximum power is related to a measurement result against the first reference signal and is not related to a measurement result against the second reference signal; and the first power is related to the measurement result against the second reference signal.

In one embodiment, the first receiver 1301 also receives first information; the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

In one embodiment, the first transmitter 1303 also transmits second information; the second information is used for indicating a first power difference, and the first power difference is equal to a difference between the first maximum power and the first power; a receiver of the second information includes the transmitter of the first reference signal; and the second information is transmitted through an air interface.

In one embodiment, the first receiver 1301 also receives (K1-1) first-type radio signal(s) among K1 first-type radio signals; the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

In one embodiment, the first receiver 1301 also receives (M1-1) second-type radio signal(s) among M1 second-type radio signals; and the second reference signal is one second-type radio signal among the M1 second-type radio signals, the M1 is an integer greater than 1.

In one embodiment, the first receiver 1301 includes at least the former four of the antenna 452, the receiver 454, the multiantenna processing processor 458, the receiving processor 456 or the controller/processor 459 illustrated in Embodiment 4.

In one embodiment, the first processor 1302 includes at lest one of the multiantenna transmitting processor 457, the transmitting processor 468 or the controller/processor 459 illustrated in Embodiment 4.

In one embodiment, the first transmitter 1303 includes at least the former four of the antenna 452, the transmitter 454, the multiantenna transmitting processor 457, the transmitting processor 468 or the controller/processor 459 illustrated in Embodiment 4.

Embodiment 14

Figure 14:
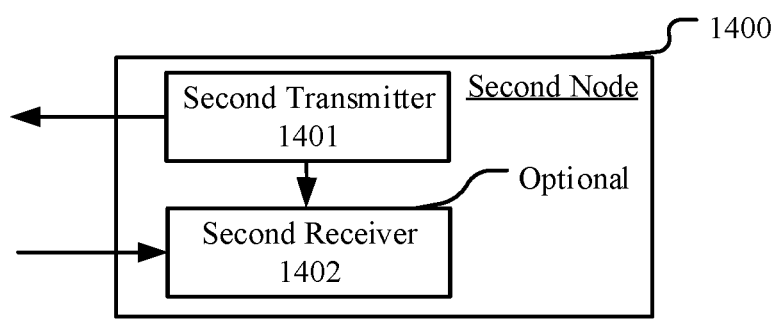
FIG. 14 is a structure block diagram illustrating a processing device in a second node according to one embodiment of the disclosure.

Embodiment 14 illustrates a structure block diagram of a processing device in a second node, as shown in FIG. 14. In FIG. 14, the processing device 1400 in the second node mainly includes a second transmitter 1401 and a second receiver 1402, wherein the second receiver 1402 is optional.

The second transmitter 1401 transmits a first reference signal.

The second receiver 1402 receives second information.

In Embodiment 14, a receiver of the first reference signal includes a first node, and the first node receives a second reference signal; a first maximum power is related to a measurement result against the first reference signal and is not related to a measurement result against the second reference signal; a first power is related to the measurement result against the second reference signal; the first node determines the first power within a range not greater than the first maximum power, and the first node transmits a first radio signal with the first power; a receiver of the first radio signal includes a transmitter of the second reference signal; the second information is used for indicating a first power difference, and the first power difference is equal to a difference between the first maximum power and the first power; and the second information is transmitted through an air interface.

In one embodiment, the second transmitter 1401 also transmits first information; the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

In one embodiment, the second transmitter 1401 also transmits (K1-1) first-type radio signal(s) among K1 first-type radio signals; the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

In one embodiment, the second transmitter 1401 includes at least the former four of the antenna 420, the transmitter 418, the multiantenna transmitting processor 471, the transmitting processor 416 or the controller/processor 475 illustrated in Embodiment 4.

In one embodiment, the second receiver 1402 illustrates at least the former four of the antenna 420, the receiver 418, the multiantenna receiving processor 472, the receiving processor 472 or the controller/processor 475 illustrated in Embodiment 4.

Embodiment 15

Figure 15:
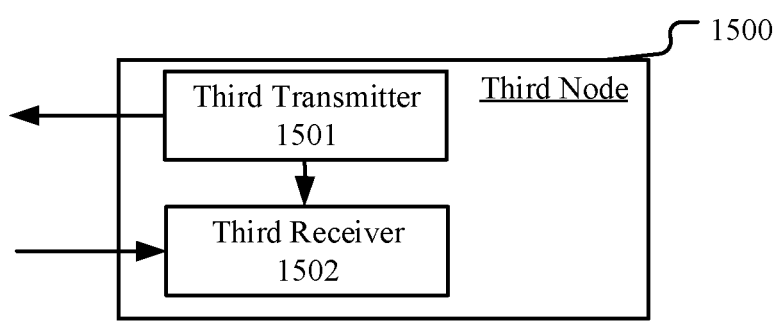
FIG. 15 is a structure block diagram illustrating a processing device in a third node according to one embodiment of the disclosure.

Embodiment 15 illustrates a structure block diagram of a processing device in a third node, as shown in FIG. 15. In FIG. 15, the processing device 1500 in the third node mainly includes a third transmitter 1501 and a third receiver 1502.

The third transmitter 1501 transmits a second reference signal.

The third receiver 1502 receives a first radio signal.

In Embodiment 15, a transmitter of the first radio signal receives a first reference signal and the second reference signal, a first maximum power is related to a measurement result against the first reference signal and is not related to a measurement result against the second reference signal; a first power is related to the measurement result against the second reference signal; a transmitter of the first radio signal determines the first power within a range not greater than the first maximum power, and transmits the first radio signal with the first power; a transmitter of the first reference signal and the third node are non co-located.

In one embodiment, the third transmitter 1501 also transmits (M1-1) second-type radio signal(s) among M1 second-type radio signals; and the second reference signal is one second-type radio signal among the M1 second-type radio signals, the M1 is an integer greater than 1.

In one embodiment, the third transmitter 1501 includes at least the former four of the antenna 420, the transmitter 418, the multiantenna transmitting processor 471, the transmitting processor 416 or the controller/processor 475 illustrated in Embodiment 4.

In one embodiment, the third receiver 1502 illustrates at least the former four of the antenna 420, the receiver 418, the multiantenna receiving processor 472, the receiving processor 472 or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but not limited to mobile phones, tablet computers, laptops, network cards, low-power equipment, eMTC terminals, NB-IoT terminals, vehicle-mounted communication equipment, aircrafts, airplanes, unmanned aerial vehicles, telecontrolled aircrafts, and other radio communication equipment. The second node in the disclosure includes but not limited to mobile phones, tablet computers, laptops, network cards, low-power equipment, eMTC terminals, NB-IoT terminals, vehicle-mounted communication equipment, aircrafts, airplanes, unmanned aerial vehicles, telecontrolled aircrafts, and other radio communication equipment. The UE or terminal in the disclosure includes but not limited to mobile phones, tablet computers, laptops, network cards, low-power equipment, eMTC terminals, NB-IoT terminals, vehicle-mounted communication equipment, aircrafts, airplanes, unmanned aerial vehicles, telecontrolled aircrafts, and other radio communication equipment. The base station or network side equipment in the disclosure includes but not limited to macro-cellular base stations, micro-cellular base stations, home base stations, relay base stations, eNBs, gNBs, TRPs, GNSS, relay satellite, satellite base station, spatial base station and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising: receiving a first reference signal from a base station and a second reference signal from a terminal equipment; determining a first power within a range not greater than a first maximum power; and transmitting a first radio signal with the first power; wherein: the first maximum power is related to a measurement result against the first reference signal and is not related to a measurement result against the second reference signal; the first power is related to the measurement result against the second reference signal; the terminal equipment receives the first radio signal; the base station and the terminal equipment are non co-located; a physical layer channel occupied by the first radio signal comprises a PSSCH; the measurement result against the first reference signal comprises a path loss, determined by the first node according to the received first reference signal, from the base station to the first node; and the measurement result against the second reference signal comprises an RSRP of the second reference signal; the first reference signal includes at least one of a Synchronization Signal Block (SSB), or a Channel State Information Reference Signal (CSI-RS); the second reference signal includes a Demodulation Reference Signal (DMRS); a physical layer channel occupied by the first radio signal includes a Physical Sidelink Shared Channel (PSSCH); the measurement result against the second reference signal includes a path loss, determined by the first node according to RSRP of the received second reference signal, from the transmitter of the second reference signal to the first node; the first maximum power is in linear correlation with the measurement result against the first reference signal.

2. The method according to claim 1, comprising: receiving first information; wherein the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

3. The method according to claim 2, comprising: receiving (K1-1) first-type radio signal(s) among K1 first-type radio signals; wherein the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

4. The method according to claim 3, wherein the K1 first-type radio signals are associated to K1 first-type reference signal resources respectively; the K1 first-type time-frequency resource pools correspond to K1 CRIs respectively, or the K1 first-type time-frequency resource pools correspond to K1 SRIs respectively; the phrase that the K1 first-type radio signals are associated to K1 first-type reference signal resources respectively means: a given first-type radio signal is any one of the K1 first-type radio signals, the given first-type radio signal is associated to a given first-type time-frequency resource pool among the K1 first-type time-frequency resource pools; and a radio signal received by the base station in the given first-type time-frequency resource pool is QCLed with the given first-type radio signal.

5. The method according to claim 2, comprising: receiving (M1-1) second-type radio signal(s) among M1 second-type radio signals; wherein the second reference signal is one second-type radio signal among the M1 second-type radio signals, the M1 is an integer greater than 1.

6. The method according to claim 1, comprising: transmitting second information; wherein the second information is used for indicating a first power difference, and the first power difference is equal to a difference between the first maximum power and the first power; a receiver of the second information comprises the base station; and the second information is transmitted through an air interface.

7. The method according to claim 1, wherein the first reference signal and the first radio signal are Quasi-Colocated (QCLed), the second reference signal and the first radio signal are QCLed; a spatial receiving parameter for the first reference signal is used for determining a transmitting antenna port group of the first radio signal, and a spatial receiving parameter for the second reference signal is used for determining a transmitting antenna port group of the first radio signal; and the first node receives the first reference signal and the second reference signal employing same spatial receiving parameters.

8. A first node for wireless communication, comprising: a first receiver, to receive a first reference signal from a base station and a second reference signal from a terminal equipment; a first processor, to determine a first power within a range not greater than a first maximum power; and a first transmitter, to transmit a first radio signal with the first power; wherein: the first maximum power is related to a measurement result against the first reference signal and is not related to a measurement result against the second reference signal; and the first power is related to the measurement result against the second reference signal; the terminal equipment receives the first radio signal; the base station and the terminal equipment are non co-located; a physical layer channel occupied by the first radio signal comprises a PSSCH; the measurement result against the first reference signal comprises a path loss, determined by the first node according to the received first reference signal, from the base station to the first node; and the measurement result against the second reference signal comprises an RSRP of the second reference signal; the first reference signal includes at least one of a Synchronization Signal Block (SSB), or a Channel State Information Reference Signal (CSI-RS); the second reference signal includes a Demodulation Reference Signal (DMRS); a physical layer channel occupied by the first radio signal includes a Physical Sidelink Shared Channel (PSSCH); the measurement result against the second reference signal includes a path loss, determined by the first node according to RSRP of the received second reference signal, from the transmitter of the second reference signal to the first node; the first maximum power is in linear correlation with the measurement result against the first reference signal.

9. The first node according to claim 8, wherein the first receiver receives first information; the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

10. The first node according to claim 9, wherein the first receiver receives (K1-1) first-type radio signal(s) among K1 first-type radio signals; the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

11. The first node according to claim 10, wherein the K1 first-type radio signals are associated to K1 first-type reference signal resources respectively; the K1 first-type time-frequency resource pools correspond to K1 CRIs respectively, or the K1 first-type time-frequency resource pools correspond to K1 SRIs respectively; the phrase that the K1 first-type radio signals are associated to K1 first-type reference signal resources respectively means: a given first-type radio signal is any one of the K1 first-type radio signals, the given first-type radio signal is associated to a given first-type time-frequency resource pool among the K1 first-type time-frequency resource pools; and a radio signal received by the base station in the given first-type time-frequency resource pool is QCLed with the given first-type radio signal.

12. The first node according to claim 8, wherein the first transmitter transmits second information; the second information is used for indicating a first power difference, and the first power difference is equal to a difference between the first maximum power and the first power; a receiver of the second information comprises the base station; and the second information is transmitted through an air interface.

13. The first node according to claim 8, wherein the first receiver receives (M1-1) second-type radio signal(s) among M1 second-type radio signals; and the second reference signal is one second-type radio signal among the M1 second-type radio signals; the M1 is an integer greater than 1.

14. The first node according to claim 8, wherein the first reference signal and the first radio signal are Quasi-Colocated (QCLed), the second reference signal and the first radio signal are QCLed; a spatial receiving parameter for the first reference signal is used for determining a transmitting antenna port group of the first radio signal, and a spatial receiving parameter for the second reference signal is used for determining a transmitting antenna port group of the first radio signal; and the first node receives the first reference signal and the second reference signal employing same spatial receiving parameters.

15. A second node for wireless communication, comprising: a second transmitter, to transmit a first reference signal; wherein: a first maximum power is related to a measurement result against the first reference signal, and is not related to a measurement result against a second reference signal transmitted from a terminal equipment; the first reference signal and the second reference signal are received by a first node; the terminal equipment receives a first radio signal transmitted from the first node to transmit the second reference signal, wherein a first power of the first radio signal is related to the measurement result against the second reference signal; the first power is within a range not greater than the first maximum power the second node is a base station; the second node and the terminal equipment are non co-located; a physical layer channel occupied by the first radio signal comprises a PSSCH; the measurement result against the first reference signal comprises a path loss, determined by the transmitter of the first radio according to the received first reference signal, from the second node to the transmitter of the first radio signal; and the measurement result against the second reference signal comprises an RSRP of the second reference signal; the first reference signal includes at least one of a Synchronization Signal Block (SSB), or a Channel State Information Reference Signal (CSI-RS); the second reference signal includes a Demodulation Reference Signal (DMRS); a physical layer channel occupied by the first radio signal includes a Physical Sidelink Shared Channel (PSSCH); the measurement result against the second reference signal includes a path loss, determined by the first node according to RSRP of the received second reference signal, from the transmitter of the second reference signal to the first node; the first maximum power is in linear correlation with the measurement result against the first reference signal.

16. The second node according to claim 15, wherein the second transmitter transmits first information; the first radio signal is transmitted in a first time-frequency resource set, and the first time-frequency resource set belongs to a first time-frequency resource pool; the first information is used for determining the first time-frequency resource pool; or the first information is used for determining K1 first-type time-frequency resource pools, and the first time-frequency resource pool is one of the K1 first-type time-frequency resource pools; and the first information is transmitted through an air interface; the K1 is an integer greater than 1.

17. The second node according to claim 16, wherein the second transmitter transmits (K1-1) first-type radio signal(s) among K1 first-type radio signals; the K1 first-type radio signals are used for determining K1 first-type maximum powers respectively, and the K1 first-type maximum powers are associated to the K1 first-type time-frequency resource pools respectively; the first maximum power is one first-type maximum power among the K1 first-type maximum powers that is corresponding to the first time-frequency resource pool; and the first reference signal is one first-type radio signal among the K1 first-type radio signals that is corresponding to the first maximum power.

18. The second node according to claim 17, wherein the K1 first-type radio signals are associated to K1 first-type reference signal resources respectively; the K1 first-type time-frequency resource pools correspond to K1 CRIs respectively, or the K1 first-type time-frequency resource pools correspond to K1 SRIs respectively; the phrase that the K1 first-type radio signals are associated to K1 first-type reference signal resources respectively means: a given first-type radio signal is any one of the K1 first-type radio signals, the given first-type radio signal is associated to a given first-type time-frequency resource pool among the K1 first-type time-frequency resource pools; and a radio signal received by the second node in the given first-type time-frequency resource pool is QCLed with the given first-type radio signal.

19. The second node according to claim 15, comprising: a second receiver, to receive second information; wherein the second information is used for indicating a first power difference, and the first power difference is equal to a difference between the first maximum power and the first power; and the second information is transmitted through an air interface.

20. The second node according to claim 15, wherein the first reference signal and the first radio signal are Quasi-Colocated (QCLed), the second reference signal and the first radio signal are QCLed; a spatial receiving parameter for the first reference signal is used for determining a transmitting antenna port group of the first radio signal, and a spatial receiving parameter for the second reference signal is used for determining a transmitting antenna port group of the first radio signal; and the transmitter of the first radio signal receives the first reference signal and the second reference signal employing same spatial receiving parameters.

\* \* \* \* \*